United States Patent [19]
Lee

[11] Patent Number: 5,313,301
[45] Date of Patent: May 17, 1994

[54] NOISE REDUCTION AND SIGNAL COMPENSATING CIRCUIT FOR VIDEO IMAGES

[75] Inventor: Kee S. Lee, Suwon, Rep. of Korea
[73] Assignee: Samsung Electronics Co., Ltd.
[21] Appl. No.: 967,769
[22] Filed: Oct. 28, 1992

[30] Foreign Application Priority Data
Oct. 28, 1991 [KR] Rep. of Korea ............ 91-18992

[51] Int. Cl.⁵ .............. H04N 5/14; H04N 5/208; H04N 9/64; H04N 5/202
[52] U.S. Cl. ............................ 348/607; 348/674
[58] Field of Search ............ 358/37, 162, 166, 310, 358/335, 141, 11, 12, 140, 167, 36, 164; H04N 5/14, 5/208, 5/20, 5/202, 9/64

[56] References Cited
U.S. PATENT DOCUMENTS

| | | | |
|---|---|---|---|
| 4,694,342 | 9/1987 | Klees | 358/166 |
| 4,789,890 | 12/1988 | Itoh et al. | 358/37 X |
| 4,825,297 | 4/1989 | Fuchsberger et al. | 358/166 |
| 4,839,726 | 6/1989 | Balopole et al. | 358/166 |
| 4,868,654 | 9/1989 | Juri et al. | 358/13 X |
| 5,070,405 | 12/1991 | Ejima et al. | 358/164 X |
| 5,113,262 | 5/1992 | Strolle et al. | 358/310 X |
| 5,119,193 | 6/1992 | Noji | 358/166 |
| 5,179,443 | 1/1993 | Sugimori et al. | 358/141 |

Primary Examiner—James J. Groody
Assistant Examiner—John W. Miller
Attorney, Agent, or Firm—Weingram & Zall

[57] ABSTRACT

The present invention relates to a noise reduction and signal compensating circuit for video imager which compensates a received picture image of a high density television or general television and permits reception of a clean image without noise, and reduces the deterioration in quality of a reproduced picture image which is attributed to a variable reproduction speed in a video cassette recorder (or video disk player).

Accordingly, this invention provides an automatic picture quality compensating circuit which has an automatic picture quality compensating means to create a clean picture image by improving sharpness and removing noise components contained in the picture image.

10 Claims, 6 Drawing Sheets

NOISE REDUCTION AND SIGNAL COMPENSATING CIRCUIT FOR VIDEO IMAGES

BACKGROUND OF THE INVENTION

1. Field of the Invention

The present invention relates to a noise reduction and signal compensating circuit. More particularly, the present invention relates to a circuit which compensates a received picture image of a high density television HDIV or general television and permits reception of a clear image without noise, and reduces deterioration in quality of a reproduced picture image occurring due to a variable reproduction speed in a videocassette recorder VCR (or video disk player VDP).

2. Description of the Prior Art

In a conventional television receiver, a method for improving the sharpness of a received picture image signal involves the use of a high pass filter (HPF) having a fixed frequency characteristic.

With such a conventional method, however, since the HPF is fixed in a high frequency filtering characteristic regardless of the condition of the received picture, the high frequency component of the noise signal is overemphasized in the picture image which has a relatively lower average brightness or the picture image has a relatively higher noise component.

As a result, picture quality is deteriorated remarkably and, hence, the background noise in the relatively dark picture image is increased considerably.

In accordance with the conventional method for television signal transmission, a band compressed transferring technique is used which employs a satellite broadcasting network of the HDTV. In such cases, a characteristic variation of transferring path is likely to occur due to a variation in weather conditions. Moreover, in the case of HDTV broadcasting using a land-controlled transferring technique, other problems are encountered, for example, a ghost image phenomenon related to multi-transferring paths in the HDTV broadcasting, interference between adjacent broadcasting channels, or deterioration of the picture quality in the long picture image recording or reproduction of a VCR (VDP).

SUMMARY OF THE INVENTION

Accordingly, an object of this invention is to provide a noise reduction and signal compensating circuit which includes a picture quality compensating means to compensate a picture image automatically and permits cleaning thereof by improving sharpness of the picture image and removing any noise components contained therein.

In order to achieve this object, there is provided an automatic picture quality compensating circuit comprising a tuning circuit portion RT for tuning a signal received through an antenna ANT, for example, HDTV signal, NTSC signal and/or a signal reproduced by a VDP or (VDP); an analog to digital converter for converting the signal tuned by the tuning circuit portion RT into digital signal; an automatic picture quality compensating process portion for compensating the received picture image by reducing noise components on the basis of the digital signal, or compensating a deterioration of the reproduced picture image occurring due to a variable image reproduction rate in the VCR/VDP; and a digital to analog converter 30 for converting the digital signal processed by the automatic picture quality compensating process portion into an analog signal and outputting the analog-converted signal through a compensated video output (CVO) terminal.

The above and other objects, features and advantages will be apparent from the following description taken in connection with the accompanying drawings.

DETAILED DESCRIPTION OF THE INVENTION

A preferred embodiment of this invention will be described below.

Figure 1:
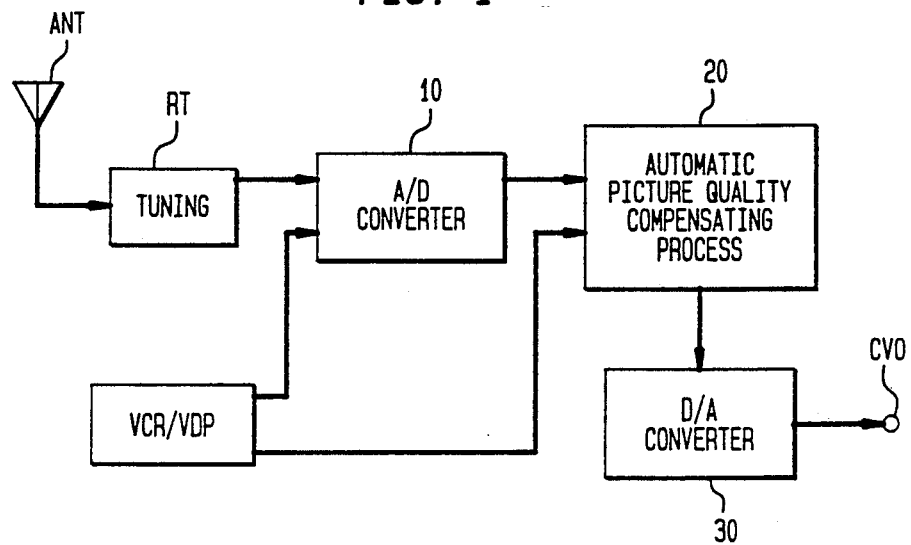
FIG. 1 is a block diagram of a noise reduction and signal compensating circuit according to a preferred embodiment of this invention.

FIG. 1 is a block diagram of a noise reduction and signal compensating circuit according to this invention. As seen from FIG. 1, the noise reduction and signal compensating circuit includes a tuning circuit portion RT for tuning a signal received through an antenna ANT, for example, an HDTV signal, NTSC signal and/or a signal reproduced by a VCR (or VDP); an analog to digital converter 10 for converting the signal tuned by the tuning circuit portion RT into a digital signal; an automatic picture quality compensating process portion 20 for compensating the received picture image by reducing noise components on the basis of the digital signal, or compensating a deterioration of the reproduced picture image which occurred due to a variable image reproducing rate in the VCR/VDP; and a digital to analog converter 30 for reconverting the digital signal processed by the automatic picture quality compensating process portion 20 into an analog signal and outputting the analog-converted signal through a compensated video (picture image) output (CVO) terminal.

Figure 2:
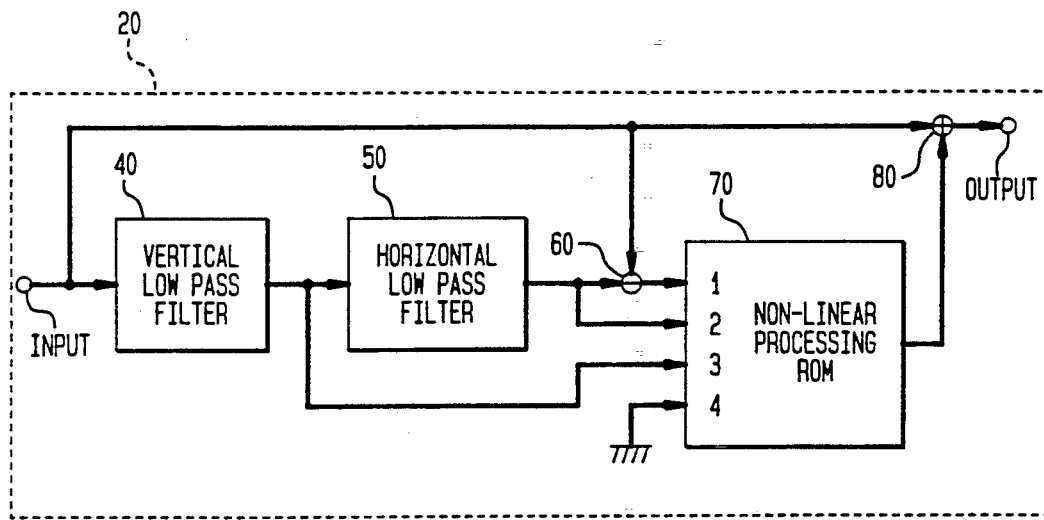
FIG. 2 is a block diagram of the picture quality compensating portion shown in FIG. 1.

FIG. 2 is a detailed block diagram of the automatic picture quality processing portion 20.

Referring to FIG. 2, the circuit 20 includes a vertical low pass filter 40 for limiting a vertical frequency band of the input picture image signal to depress a vertical high-frequency noise component in the picture image; in a vertical direction, a horizontal low pass filter 50 for limiting a horizontal frequency band of the picture image signal to depress a horizontal high-frequency noise component in the picture image; a subtracter 60 for obtaining a difference between the original picture image inputted through the input terminal INPUT and the horizontally and vertically band-limited signals to produce the horizontal and vertical high frequency filtering characteristics; a non-linear processor ROM 70 for non-linearly processing the signals from the horizontal and vertical low pass filters 40 and 50 and the subtracter 60 and then selecting the processed signals by means of a selection control switch; and an adder 80 for adding the signals selectively outputted from the ROM 70 and the original picture image from the input terminal INPUT and outputting the added signal through a terminal OUTPUT.

Figure 3:
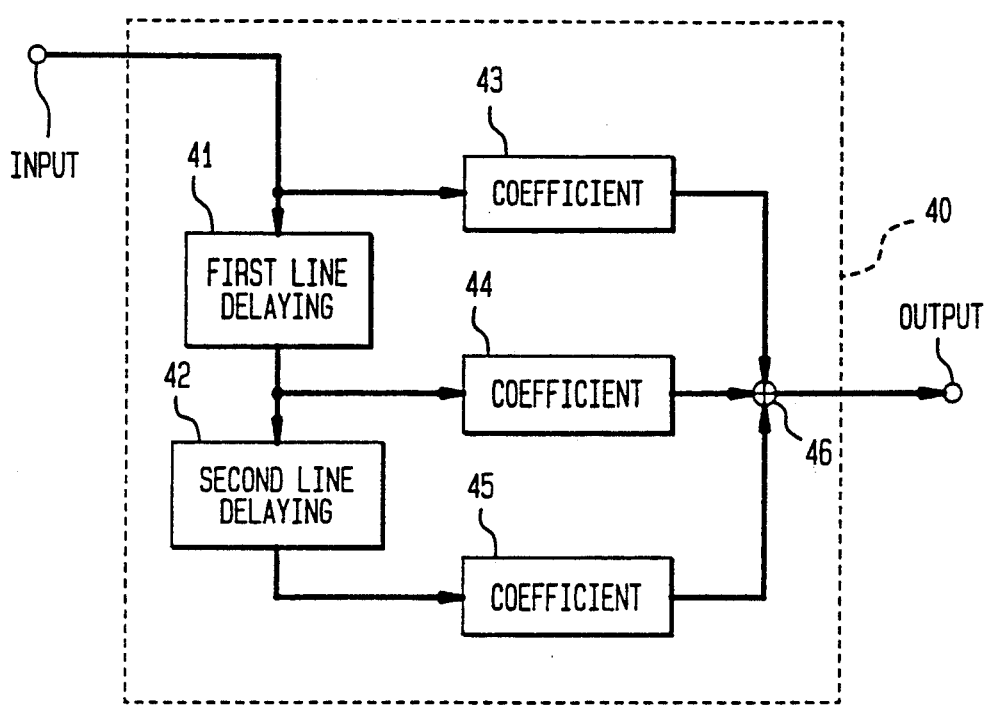
FIG. 3 is a block diagram of a vertical low pass filter of FIG. 2.

Referring to FIG. 3, there is shown a block diagram of the vertical low pass filter 40 of FIG. 2. In this figure, the vertical low pass filter 40 includes a first and second line delaying portions 41 and 42, respectively, for delaying the input picture image signal by one line or two lines, respectively; a plurality of counters 43, 44 and 45 for multiplying the first inputted signal and the delayed signals by predetermined factors; and an adder 46 for adding the multiplied signals.

Figure 4:
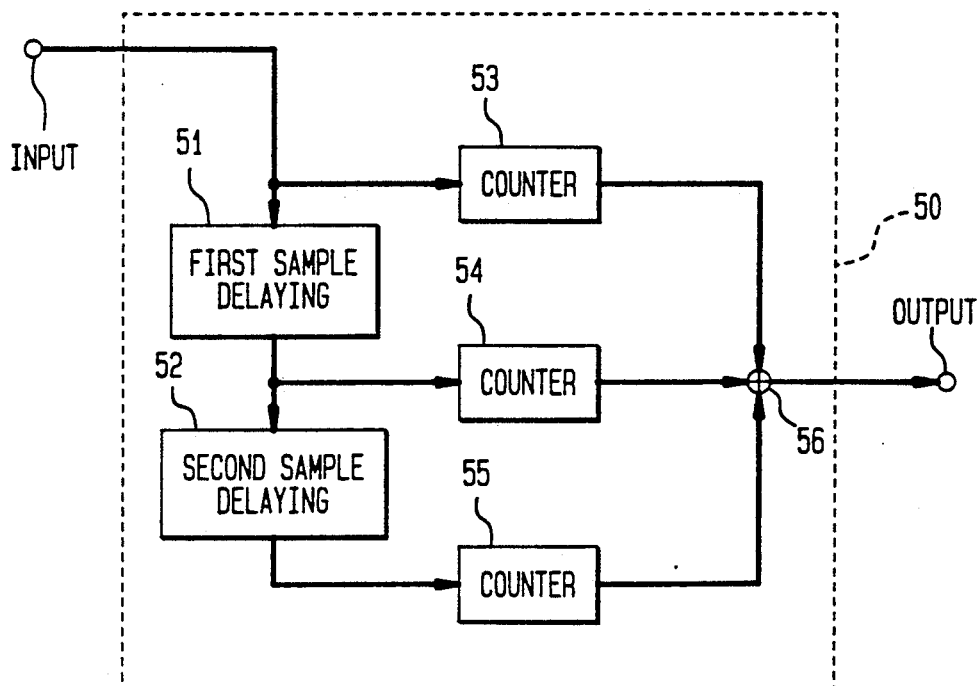
FIG. 4 is a block diagram of a horizontal low pass filter of FIG. 2.

FIG. 4 is a detailed block diagram of the horizontal low pass filter 50 of FIG. 2. As shown in FIG. 4, the horizontal low pass filter 50 includes first and second sample delaying portions 51 and 52 for delaying the input picture image signal by one sample and two samples, respectively; a plurality of counters 53, 54 and 55 for multiplying the first inputted signal and the delayed signals by predetermined factors; and an adder 56 for adding the multiplied signals.

Figure 5:
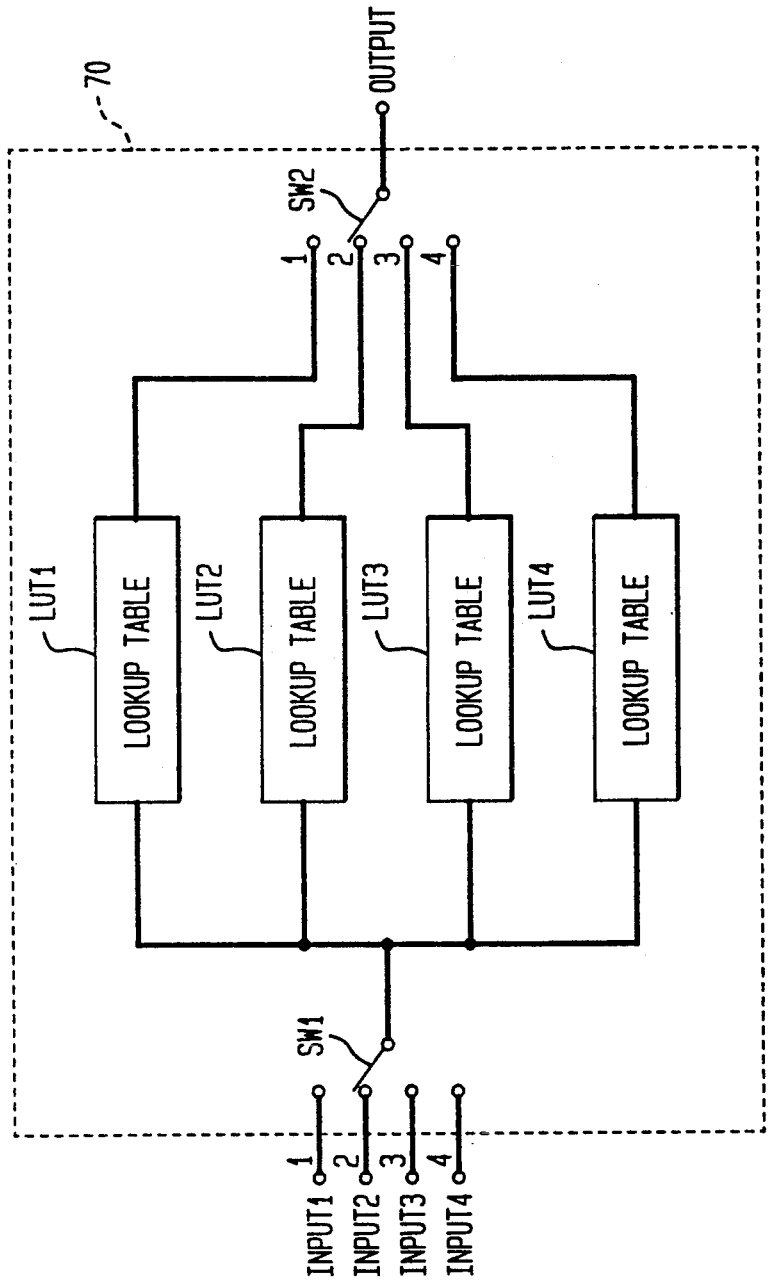
FIG. 5 is a block diagram of a non-linear processor ROM of FIG. 2.

FIG. 5 is a block diagram of the non-linear processor ROM 70 of FIG. 2. This ROM 70 includes a selection control switch SW1 for selectively controlling the signal components inputted from the terminals INPUT1 to INPUT4, Lookup tables LUT1 to LUT4 for non-linearly processing the selected signal from the selection control switch SW1 and a selection control switch SW2 for selectively outputting at least one of the non-linearly processed signals.

The operation and effect of the present invention will now be described.

First, the vertical frequency band of the picture image signal which is input through the input terminal INPUT is limited by the vertical low pass filter 40 to depress the vertical high frequency noise component contained in the picture image signal. That is, the picture image signal inputted to the vertical low pass filter 40 is supplied to the first and second line delaying portions 41 and 42. Accordingly, the signal is delayed by the delaying circuit portions 41 and 42 by one line and two lines, respectively. Thus, delayed signals and the first input signal are supplied to the counters 43, 44 and 45 which multiply them by predetermined factors. These multiplied signals are then added at the adder 46 and outputted through the terminal OUTPUT.

Consequently, the vertical high frequency noise-depressed signal is supplied to a terminal (3) of the non-linear process ROM 70 and, at the same time, is supplied to the horizontal low pass filter 50 which limits the horizontal high-frequency noise component of the picture image. More particularly, the image signal inputted to the horizontal low pass filter 50 is delayed at the first and second sample delaying portions 51 and 52 by one sample and two samples, respectively.

Sequentially, the delayed signals and the first input signal are multiplied by means of the counters 53, 54 and 55 by predetermined factors respectively. Thus, multiplied signals are supplied to the adder 56 which adds them and outputs the added signal through the terminal OUTPUT.

As mentioned above, the horizontal high frequency noise of the picture image is reduced and then supplied to a port (2) of the non-linear processing ROM 70 and the subtracter 60. Accordingly, the subtracter 60 produces a difference between the original picture image signal inputted through the input terminal INPUT and the horizontal and vertical band-limited signals to obtain the horizontal and vertical high-frequency filtering characteristics.

The horizontal and vertical high frequency-filtered signal components are supplied to a port (1) of the non-linear processor ROM 70 of which a port (4) is not inputted with any signal.

The signals inputted to the port (1) of the non-linear processor ROM 70 are selected by the selection control switch SW1 on the basis of the amplitude of noise contained in the received (or reproduced) picture image signal, average brightness of the picture image and standard/long-time reproducing (playing) mode, as shown in Table I, and the selected signal is input to Lookup tables LUT1 to LUT4 in the non-linear processor ROM 70.

TABLE I

| control signal | control selection | selection of SW1 | selection of SW2 | final picture process |
|---|---|---|---|---|
| degree of noise | high | 2 | 1 | horizontal and vertical high-frequency filtering |
|  | medium | 3 | 2 | vertical high-frequency filtering |
|  | low | 1 | 3 | vertical and horizontal high-frequency passing |
| average brightness | high | 1 | 3 | vertical and horizontal high-frequency passing |
|  | medium | 4 | 2 | original signal output |
|  | low | 2 | 1 | horizontal and vertical high-frequency filtering |
| reproducing mode | standard | 1 | 3 | horizontal and vertical high-frequency passing |
|  | long-time | 2 | 1 | horizontal and vertical high-frequency filtering |

Next, the input signal is non-linearly processed in a form of Lookup tables and then supplied to terminals (1), (2), (3), and (4) of the selection control switch SW2. The non-linear process by way of the Lookup tables LUT1 to LUT 4 is executed by programming conversion data having characteristics as shown in FIG. 10.

Figure 10:
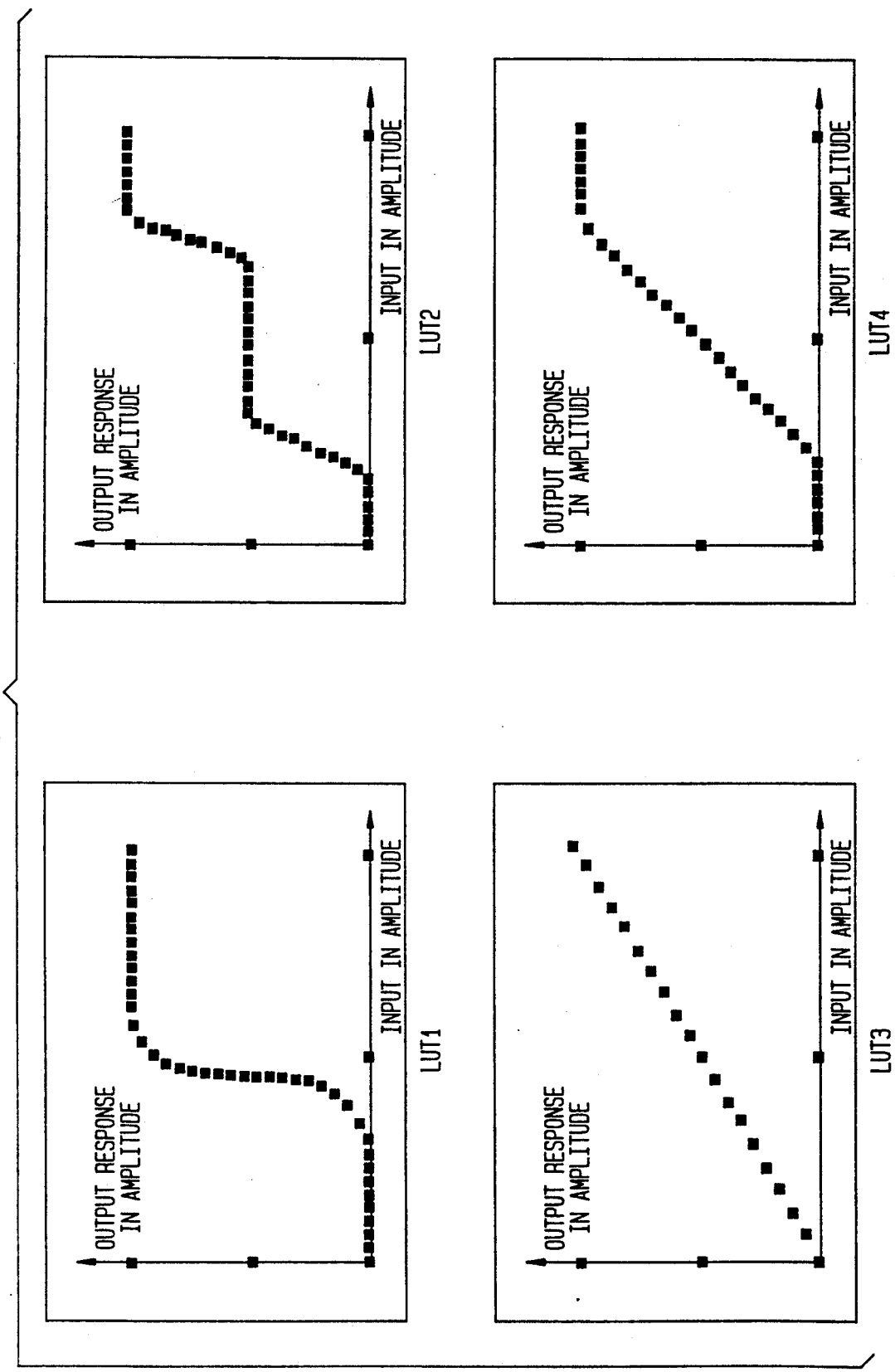
FIG. 10 is a graphical representation illustrating a characteristic of a non-linear processor.

More specifically, the Lookup table LUT1 as shown in FIG. 10 is defined such that the small region in amplitude of the input signal is relatively great in attenuation as compared with a large region in amplitude of the signal on the basis of the amplitude of the input signal to depress the signal component having a relatively higher noise component and a low pass filtering characteristic.

In the case of the Lookup table LUT2, the input signal is linearly processed to obtain the medium noise level and brightness signal with relation to the input signal. The Lookup table LUT3 is defined such that the small region in amplitude of the input signal is relatively great in attenuation a compared with the large region in amplitude thereof and has a non-linear conversion curve.

Herein, the LUT3 is a different gradient of the converted curve and suddenly changing position from the LUT3.

Meanwhile, the Lookup tables LUT4 and LUT2 have similar conversion characteristics but are different in gradient and deviation value of a converted curve.

The signals converted by the Lookup tables LUT1 to LUT4 are selected by the selection control switch SW2 in a form of Table I and supplied to the adder 80 (see FIG. 2) which adds the signals to the original picture image signal and outputs the added signal through the terminal OUTPUT. Accordingly, the characteristic in amplitude and frequency of the input signal to the output signal can be varied in correspondence to the degree of noise, the average brightness of the picture and the reproducing rate to thereby advantageously compensate the picture quality.

Figure 6:
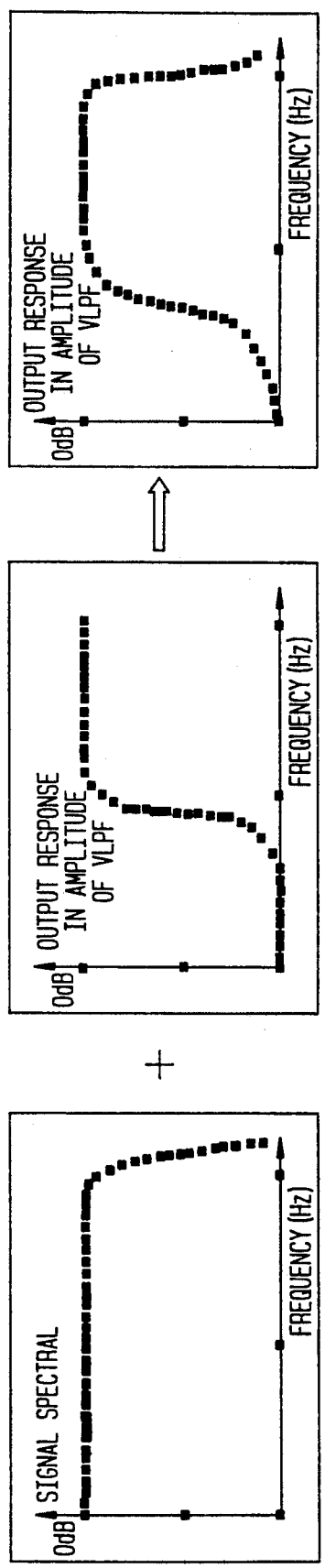
FIG. 6 is a graphical representation illustrating characteristics of a vertical low pass filter and high pass filter.
Figure 7:
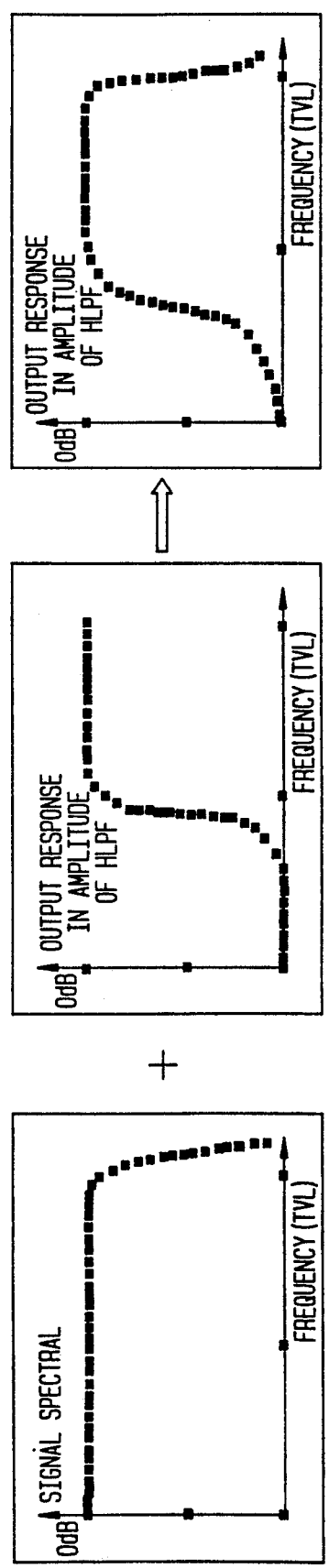
FIG. 7 is a graphical representation illustrating characteristics of a horizontal low pass filter and high pass filter.
Figure 8:
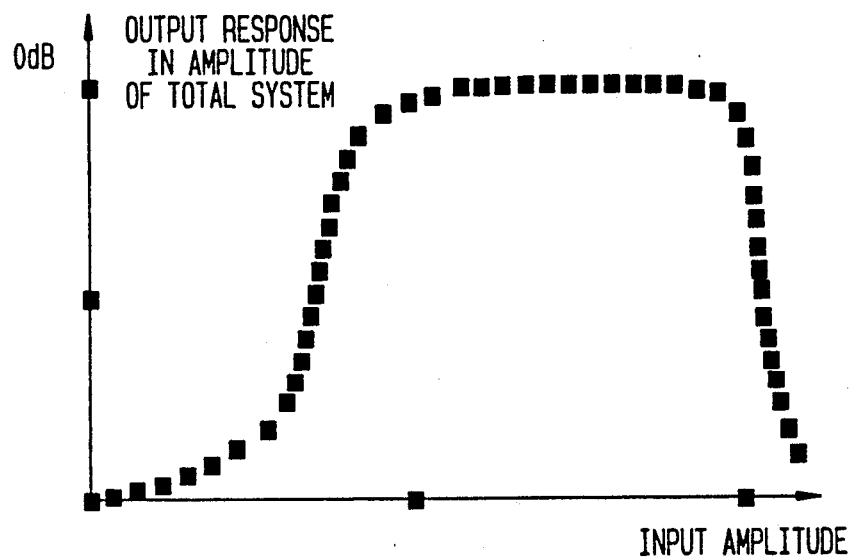
FIG. 8 is a graphical representation illustrating characteristics in amplitude of an input signal to an output signal.
Figure 9:
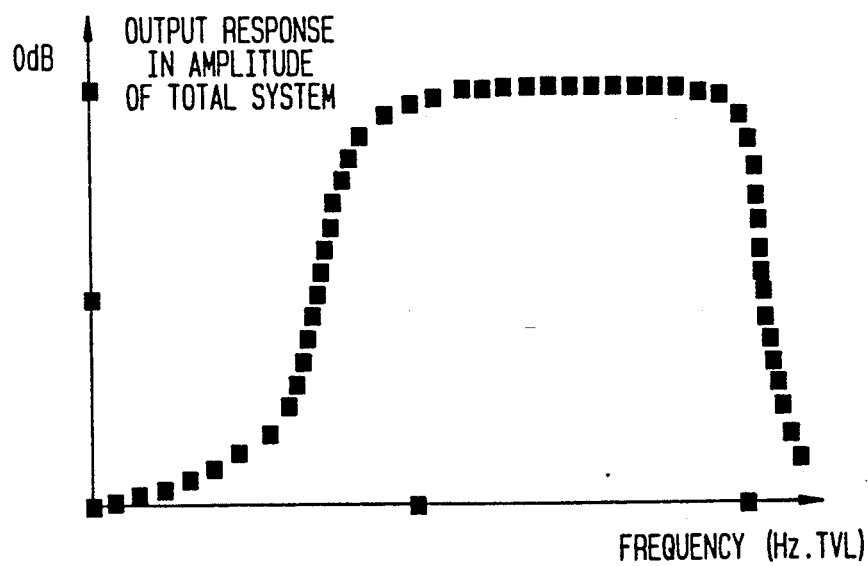
FIG. 9 is a graphical representation illustrating a characteristic of the frequency to the amplitude of the output signal.

FIG. 6 is a graphical representation illustrating characteristics of the vertical low pass filter and high pass filter, FIG. 7 is a graph illustrating characteristics of the horizontal low pass filter and high pass filter, FIG. 8 is a graph illustrating characteristics in amplitude of an input signal to an output signal and FIG. 9 is a graph illustrating a characteristic of the frequency to the amplitude of the output signal.

As described above, according to this invention, the noise component in the received signal can be adaptively removed.

Also, if the picture image is lower in average brightness, then the level of the noise is sufficiently decreased and the deterioration in quality of the picture image which occurred at the long-time recording or reproducing mode of the VCR (VDP) can be improved considerably.

Further, the sharpness in the horizontal and vertical direction is enhanced for the picture image having a lower noise and/or higher average brightness, or the standard recorded and/or reproduced image signal. As a result, the received picture image or reproduced picture image can be improved in quality.

Although, the invention has been described with reference to the specified embodiment herein, various modifications and changes will be made therein without departing from the spirit and scope of the invention.

I claim:

1. A circuit for removing noise from a video image and compensating the quality thereof, comprising:
   a tuning circuit for tuning a video signal received from an antenna;
   an analog to digital converter for converting said signal tuned by said tuning circuit into a digital signal;
   a picture compensating circuit for compensating said digital signal, wherein noise of said digital signal is reduced automatically based upon noise components of said digital signal, and deterioration of a video image caused by variable image reproduction rate is reduced automatically,
   said picture compensating circuit includes a vertical low pass filter for limiting a vertical frequency band of said digital signal to depress high frequency noise in a vertical direction, a horizontal low pass filter for limiting a horizontal frequency band of said digital signal to depress a high frequency noise in a horizontal direction, a subtracter for obtaining a difference between said digital signal inputted through an input terminal and said horizontally and vertically band-limited signals to produce horizontal and vertical high frequency filtering characteristics, a non-linear processor ROM for non-linearly processing said signals from said horizontal and vertical low pass filters and said subtracter and then selecting processed signals by a selection control switch, and an adder for adding said signal outputted from said ROM with said signal at said input terminal and outputting said added signal through a terminal output;
   said non-linear processor ROM includes a first control switch for selectively controlling signal components inputted from terminals INPUT1 to INPUT4, Lookup tables LUT1 to LUT4 for non-linearly processing a signal selected from said control switch and a second control switch for selectively outputting said non-linearly processed signal; and
   a digital to analog converter for converting said digital signal processed by said picture compensating circuit into an analog signal and outputting said analog-converted signal through a compensated video output terminal.

2. A circuit according to claim 1, wherein said vertical low pass filter includes first and second line delaying circuits for delaying said digital signal by one line and two lines, respectively, a plurality of counters for multiplying a first inputted signal and said delayed signal by predetermined factors, and an adder for adding said multiplied signals.

3. A circuit according to claim 1, wherein said horizontal low pass filter includes first and second sample delaying portions for delaying said digital signal by one sample and two samples, respectively, a plurality of counters for multiplying a first inputted signal and said delayed signals by predetermined factors, and an adder for adding said multiplied signals.

4. A circuit according to claim 1, wherein said video signal is a television signal.

5. A circuit according to claim 1, wherein said video signal is a high-definition television signal.

6. A circuit according to claim 1, wherein said video signal is an NTSC signal.

7. A circuit according to claim 1, wherein said video signal is from a video cassette recorder.

8. A circuit according to claim 1, wherein said video signal is from a video disk player.

9. A circuit for removing noise from a video image and compensating the image quality thereof, comprising:
   a tuning circuit for tuning a television signal received through an antenna;
   an analog to digital converter for converting said television signal tuned by said tuning circuit and a video signal supplied from a video cassette recorder into a digital signal;
   a picture quality compensating circuit for selectively receiving said digital signal and a digital video signal supplied from a video disk player and compensating said digital signal and said digital video signal to reduce noise components mixed in said television signal when said television signal is received through said antenna and when said noise components mixed in said digital video signal are due to variation of speed reproduction of said digital video signal reproduced by said video cassette recorder, said picture quality compensating circuit including a vertical low pass filter for removing a high frequency component in an a vertical synchronizing signal contained in said selectively received signals such that said noise component is removed from said vertical synchronizing signal, a horizontal low pass filter for removing a high frequency component in a horizontal synchronizing signal contained in an output signal of said vertical low pass filter such that said noise component is removed from said horizontal synchronizing signal, a subtracter to subtract said output signal of said horizontal low pass filter from said selectively received signal to obtain high frequency filtering characteristics, a ROM for selectively receiving an output signal of said subtracter and said output signals of said low pass filter by an input control signal supplied from control means of said picture quality compensating circuit to non-linearly store data as image characteristic data corresponding to an input signal of said ROM, and an adder to add said stored data from said selectively received signal of said vertical low pass filter;

a digital to analog converter for converting said signals compensated by said picture quality compensating circuit into analog signals and providing said analog signals to a video output terminal.

10. A circuit according to claim 9, wherein said ROM includes first switching means for selecting one of said input signals of said ROM by said input control signal supplied from said control means, storage means for storing said image characteristic data to be divided into a plurality of Lookup tables, and second switching means for selecting said image characteristic data from one of said Lookup tables by an output control signal supplied from said control means.

* * * * *